(12) United States Patent
Colistro (10) Patent No.: US 6,739,612 B2
(45) Date of Patent: May 25, 2004

(54) OFFSET ARM FOR TOWING ROTARY MOWERS AND THE LIKE

(75) Inventor: Vincent Colistro, Saskatoon (CA)

(73) Assignee: Schulte Industries Ltd., Engelfeld (CA)

( * ) Notice: Subject to any disclaimer, the term of this patent is extended or adjusted under 35 U.S.C. 154(b) by 0 days.

(21) Appl. No.: 10/393,738

(22) Filed: Mar. 21, 2003

(65) Prior Publication Data

US 2004/0070172 A1 Apr. 15, 2004

(30) Foreign Application Priority Data

Oct. 2, 2002 (CA) ............................................. 2406155

(51) Int. Cl.⁷ ............................................. A01B 59/046
(52) U.S. Cl. ....................... 280/475; 280/472; 280/409; 280/491.2; 172/313
(58) Field of Search ................................ 56/6; 172/313, 172/311, 324; 280/409, 447, 456.1, 467, 472, 473, 475, 478.1, 491.2

(56) References Cited

U.S. PATENT DOCUMENTS

| | | | | |
|---|---|---|---|---|
| 1,728,098 A | * | 9/1929 | Bork | 56/6 |
| 2,827,308 A | * | 3/1958 | Hedrick et al. | 280/472 |
| 3,015,499 A | * | 1/1962 | Van Der Lely et al. | 172/677 |
| 4,019,643 A | * | 4/1977 | Kampman et al. | 414/481 |
| 4,123,082 A | * | 10/1978 | Conner | 280/467 |
| 4,381,118 A | * | 4/1983 | Weeks | 280/412 |
| 4,455,034 A | * | 6/1984 | de Graff et al. | 56/228 |
| 4,512,687 A | * | 4/1985 | Enns | 406/41 |
| 4,637,625 A | * | 1/1987 | Blackwell | 280/411.1 |

* cited by examiner

Primary Examiner—Avraham Lerner
(74) Attorney, Agent, or Firm—John F. Salazar; James E. Cole; Middleton Reutlinger (57) ABSTRACT

An offset tow arm apparatus for towing an implement supported by at least one wheel having a rotational axis perpendicular to the operating travel direction comprises a tow arm having an inner end and an outer end. A pivot arm has a rear end pivotally attached to an inner portion of the tow arm and a front end adapted for pivotal attachment to a towing vehicle hitch. A lock is operative to lock the pivot arm in a fixed position with respect to the tow arm. An outer castor wheel is pivotally attached to the apparatus to support the outer end of the lateral, and an inner castor wheel is pivotally attached to support the inner end of the tow arm. An implement hitch is attached to an outer portion of the tow arm between the outer and inner castor wheels and is adapted for attachment of an implement to be towed behind the tow arm. The apparatus is adapted to prevent lateral movement of the implement with respect to the tow arm.

24 Claims, 6 Drawing Sheets

OFFSET ARM FOR TOWING ROTARY MOWERS AND THE LIKE

CROSS REFERENCE TO PRIOR APPLICATION

This application claims priority to Canadian Patent Application No. 2,406,155, filed on Oct. 2, 2002, which is incorporated herein by reference.

TECHNICAL FIELD

This invention is in the field of implements for towing behind a tractor or like towing vehicle, and in particular an apparatus that allows such implements to be towed on a path offset from the tractor.

BACKGROUND OF THE INVENTION

It is sometimes desirable to tow an implement along a path that is offset from the path of the tractor. An example is where a rotary mower is used to cut a roadside ditch area that slopes downward from the edge of the road. Conventionally the mower follows substantially behind the tractor, requiring the tractor to travel on the slope of the ditch. This travel path can be hazardous where the ditch slope is steep. U.S. Pat. No. 5,957,475 to Pearen et al. discloses an offset hitch for towing an implement, such as a rotary mower. The apparatus comprises a frame with a hitch coupling attached on an arm at the front of one end for attachment to the tractor draw bar hitch, and a draw bar hitch at the rear of the opposite end of the frame for attachment to a mower. The mower is conventional and attached to the draw bar hitch of the apparatus in the same manner as it would be attached to a conventional tractor draw bar hitch.

Ground wheels fixed to the frame define an intended direction of working movement. Towing the mower at the outside end of the frame causes a torque on the frame that tends to move the outside end of the frame back, pivoting about the vertical axis at the tractor draw bar hitch. The ground wheels attached to the frame however are fixed in alignment with the travel direction and resist this torque, maintaining the travel direction.

The hitch and mower assembly can pivot about a vertical yaw axis at the tractor draw bar hitch, in the same manner as any conventional mower. The attachment of the mower to the draw bar hitch at the outside rear of the frame is also conventional such that the assembly can also pivot about a vertical yaw axis at the draw bar hitch at the rear of the apparatus. Thus the wheels on the mower do not resist any lateral torque, and this function is accomplished solely with the fixed ground wheels attached to the frame. Resisting this torque causes considerable side forces on the ground wheels.

Figure 2:
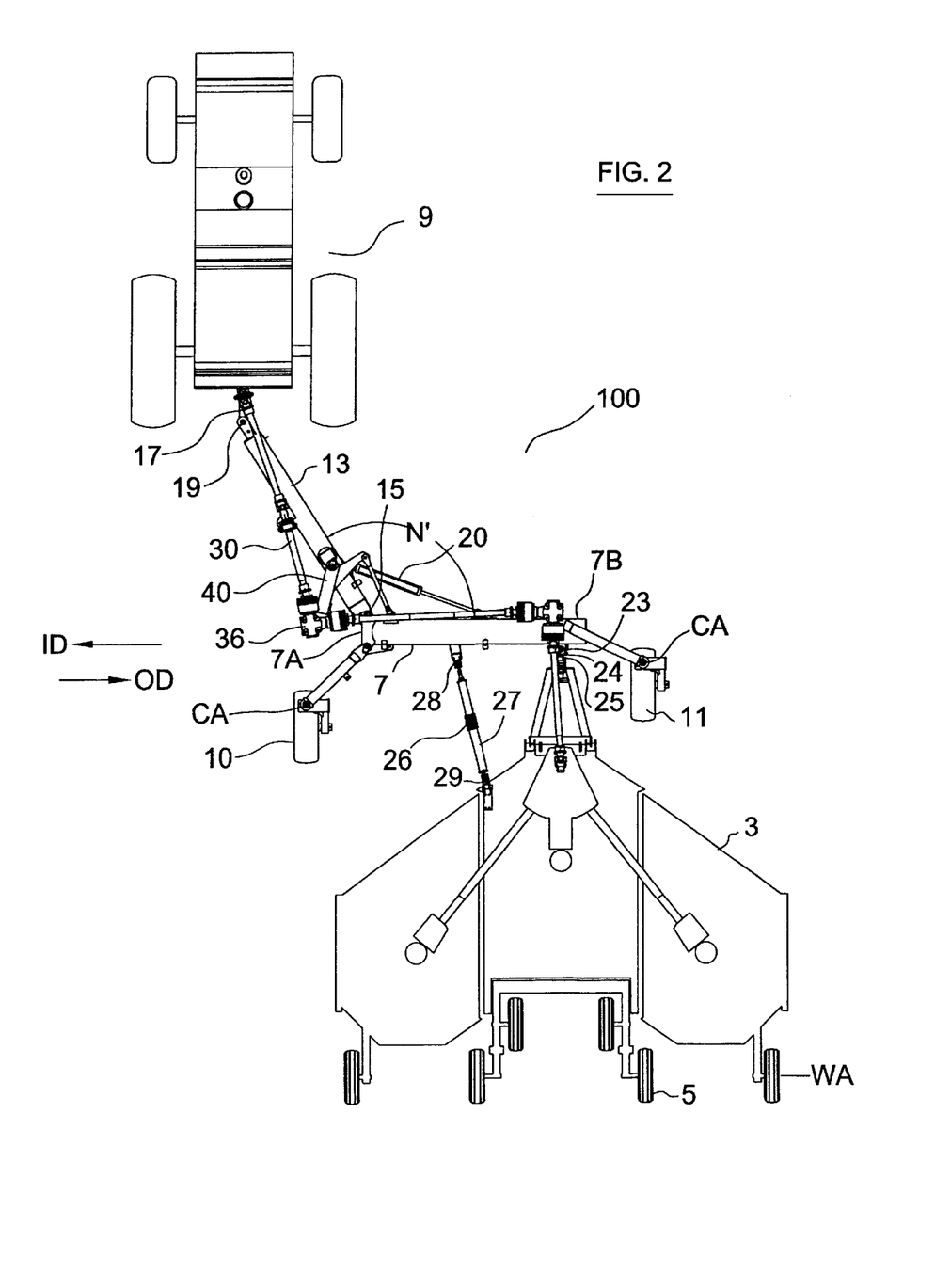
FIG. 2 is a top view of an offset tow arm apparatus and offset rotary mower apparatus of the invention, shown in the maximum offset position.

The arm at the front of the frame can be pivoted to various positions to vary the amount of offset from a maximum to a minimum transport position. The arm can be pivoted on the go with a hydraulic cylinder, as illustrated in FIG. 2 of the '457 patent. With the ground wheels fixed, pivoting the arm from one side to the other can increase the side forces on the ground wheels, especially on sloped terrain.

When attempting to back up the apparatus of Pearen et al., the connected assembly of the tractor, frame, and mower can pivot at the tractor draw bar and also at the apparatus draw bar, making it very difficult, if not impossible, to back up the mower. Often when mowing ditch slopes the apparatus will encounter signs or like obstructions, necessitating steering around the obstruction. It would be an advantage to be able to mow close to the obstruction and then back away before moving around it.

Another disadvantage of the apparatus of Pearen et al. is that when the arm at the front of the frame is positioned for transport, as illustrated in FIG. 2 of the '457 patent, the mower is still in a significantly offset position such that when the tractor is on the road, the mower extends into the ditch, reducing safe transport speeds.

Conventional attachment of a mower should also allow the mower to pivot about a pitch axis oriented horizontal and perpendicular to the operating travel direction and to pivot about a roll axis oriented horizontal and parallel to the operating travel direction, as well as allowing the mower to pivot about the vertical yaw axis. The roll and pitch axes may be provided by a mechanism with pins, bushings and the like, or may simply be provided by a loose fit of the vertical pin attaching the mower to the draw bar hitch. In any event the mower should be able to roll and pitch to a certain extent at least in order to follow ground contours independently of the towing vehicle.

SUMMARY OF THE INVENTION

It is an object of the present invention to provide an offset tow arm apparatus for rotary mowers, and like implements having wheels fixed in an operating travel direction, that overcomes disadvantages of the prior art. It is a further object of the present invention to provide such an offset tow arm apparatus that allows the attached implement to be more easily moved in a rearward direction than the apparatuses of the prior art. It is a further object of the present invention to provide such an offset tow arm wherein stress on the wheels supporting the apparatus is reduced.

It is a further object of the present invention to provide an offset tow arm apparatus that comprises a tow arm extending laterally from the implement, and laterally fixed to the implement, and supported on castor wheels so that the tow arm can move freely in any direction, and the direction of the implement and offset hitch is dictated by the wheels supporting the implement.

It is a further object of the present invention to provide an offset rotary mower apparatus that is more easily moved in a rearward direction than the apparatuses of the prior art.

In a first aspect the present invention provides an offset tow arm apparatus for towing an implement in an operating travel direction, where the implement is supported by at least one wheel having a rotational axis substantially perpendicular to the operating travel direction.

The apparatus comprises a tow arm having an inner end adapted for pivotal attachment at a front portion thereof to a towing vehicle hitch such that the tow arm extends laterally from an attached towing vehicle, and such that the tow arm can pivot about a substantially vertical axis, and an outer end. At least one castor wheel is pivotally attached to the tow arm about a substantially vertical castor axis to support the tow arm for movement along the ground in any direction. An implement attachment mechanism is located at an outer portion of the tow arm and is adapted for attachment of an implement to be towed behind the tow arm such that the attached implement is prevented from pivoting about a vertical axis with respect to the tow arm.

The invention provides, in a second aspect, an offset rotary mower apparatus adapted at a front end thereof for attachment to a tractor for movement in an operating travel direction. The apparatus comprises a rotary mower unit supported at a rear end thereof by at least one rear wheel having a rotational axis oriented substantially perpendicular to the operating travel direction. A tow arm extends laterally from a front end of the rotary mower unit such that an inner end of the tow arm is offset from the rotary mower unit, and such that the tow arm is maintained in a substantially fixed lateral position with respect to the rotary mower unit. A pivot arm extends forward from the inner end of the tow arm and has a rear end pivotally attached to the tow arm about a substantially vertical axis, and has a front end adapted for pivotal attachment to a tractor draw bar hitch such that the pivot arm can pivot about a substantially vertical axis. An actuator is operative to selectively pivot the pivot arm with respect to the tow arm, and is operative to maintain the pivot arm in a selected fixed position with respect to the tow arm. An outer castor wheel is pivotally attached to the apparatus about a substantially vertical castor axis to support the outer end of the tow arm for movement along the ground, and an inner castor wheel is pivotally attached to the apparatus about a substantially vertical castor axis to support the inner end of the tow arm for movement along the ground. A driveline is adapted at an inner front end thereof for operative connection to a power output shaft of a tractor and operatively connected at an outer rear end thereof to a power input shaft of the rotary mower unit.

The invention provides, in a third aspect, an offset rotary mower apparatus adapted at a front end thereof for attachment to a tractor for movement in an operating travel direction. The apparatus comprises a rotary mower unit supported at a rear end thereof by at least one rear wheel having a rotational axis oriented substantially perpendicular to the operating travel direction. A tow arm extends laterally from a front end of the rotary mower unit such that an inner end of the tow arm, adapted for attachment to a towing vehicle, is offset from the rotary mower unit. Means are provided to substantially prevent lateral movement of the tow arm with respect to the rotary mower unit. At least one castor wheel is pivotally attached to the apparatus about a substantially vertical castor axis to support the tow arm for movement along the ground in any direction.

The assembled implement and tow arm are fixed laterally with respect to each other, and the offset end of the tow arm is attached to the tow vehicle. The assembly may thus be reversed in much the same manner as any conventional implement, as opposed to prior art systems where the attached assembly includes a second vertical axis, and reversing is difficult.

During operation, through turns and the like, the castor wheels will swivel with minimal resulting side force on the castor wheels. Conventional attachment of many implements requires the tractor to carry considerable weight. When using an offset tow arm apparatus, that weight is carried on the wheels of the apparatus and so can exert considerable stress if the wheels must move laterally without swiveling.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
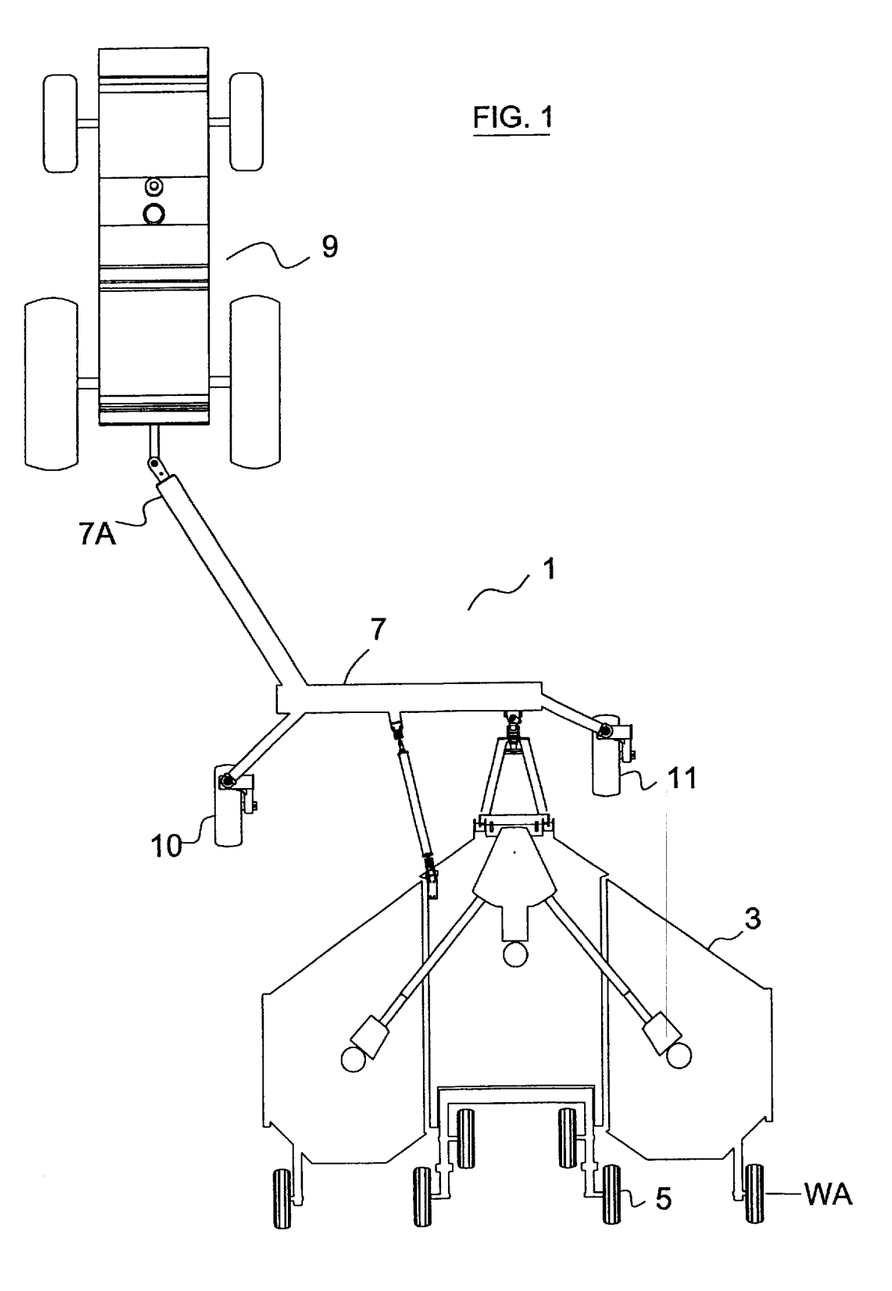
FIG. 1 is a top view of a basic embodiment of an offset tow arm apparatus of the invention.

FIG. 1 illustrates a basic offset tow arm apparatus 1 for towing an implement, illustrated as a rotary mower unit 3, in an operating travel direction T. The driveline to rotate the mower blades with power from the tractor has been deleted for clarity of illustration. The rotary mower unit 3 is supported by rear wheels 5. The rear wheels 5 are fixed to the rotary mower unit 3 such that the rotational axis WA of the rear wheels 5 is substantially perpendicular to the operating travel direction T, as illustrated. The rear wheels 5 thus dictate the travel direction of the rotary mower unit 3. If the travel direction is other than that indicated by T, the rear wheels 5 will skid, and will tend to pull the rotary mower unit 3 back into alignment with the operating travel direction T, where side forces on the wheels are minimized.

The apparatus 1 takes advantage of the directional control provided by the rear wheels 5. A tow arm 7 extends laterally from a front end of the rotary mower unit 3 such that an inner end 7A of the tow arm 7, adapted for attachment at a front portion thereof to a towing vehicle, illustrated as tractor 9, is offset from the rotary mower unit 3. Means, illustrated as strut 27, are provided to substantially prevent lateral movement of the tow arm 7 with respect to the rotary mower unit 3. The tractor 9 is hitched to the end of the tow arm 7 to tow the assembly. The tractor 9 and the rotary mower unit 3 both travel in the operating travel direction T but on offset paths as can be seen in FIG. 1.

The tow arm 7 is supported by castor wheels 10, 11. The castor wheels 10, 11 swivel about a vertical axis and so do not control the direction of the apparatus 1, but only maintain the apparatus 1 and the front end of the rotary mower unit 3 at the proper height and facilitate movement along the ground. In the embodiment of FIG. 1 the tow arm 7 is illustrated as a single rigid member bent to facilitate attachment to the tractor 9. More versatility is provided by providing a pivot arm 13 pivotally attached to a substantially straight tow arm 7, as described below, so that the offset distance can be conveniently varied, and transport is facilitated.

Figure 3:
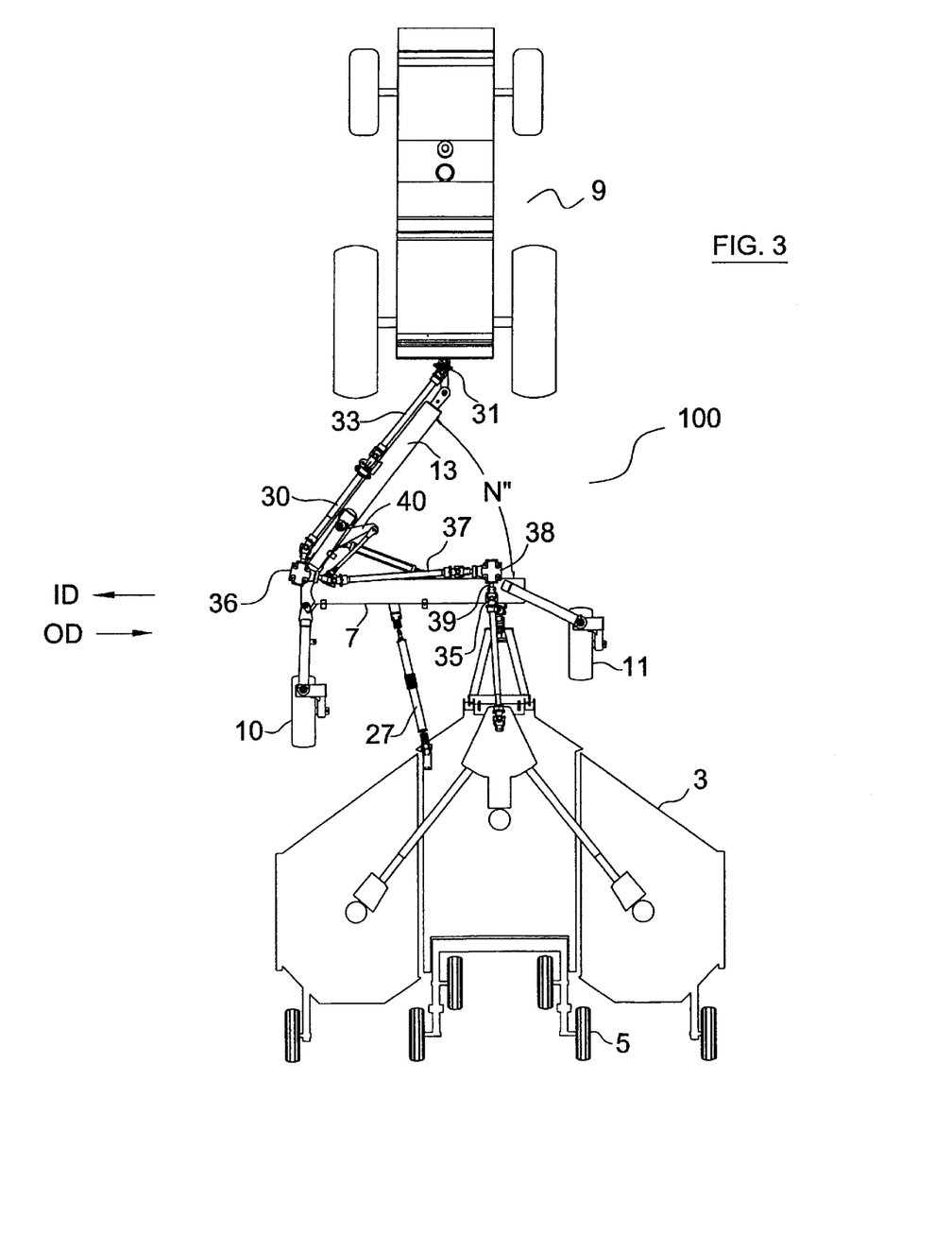
FIG. 3 is a top view of the embodiment of FIG. 2, shown in the transport position.

FIGS. 2 and 3 illustrate a rotary mower apparatus 100 comprising a tow arm 7 having an inner end 7A and an outer end 7B. A pivot arm 13 has a rear end pivotally attached to an inner portion of the tow arm 7, illustrated as the inner end 7A, about a substantially vertical axis at pivot arm pin 15. A front end of the pivot arm 13 is adapted for pivotal attachment to the tractor hitch 17 such that the pivot arm 13 can pivot about a substantially vertical axis at the hitch pin 19.

A lock, illustrated as hydraulic cylinder 20, is operative to lock the pivot arm 13 in a fixed position with respect to the tow arm 7. The hydraulic 20 is operative to selectively pivot the pivot arm 13 with respect to the tow arm 7 to vary the angle between the tow arm 7 and pivot arm 13 from the maximum offset angle N' illustrated in FIG. 2 to the minimum offset or transport angle N" illustrated in FIG. 3. The hydraulic cylinder 20 allows an operator to vary the offset angle while traveling, and is operative to maintain the pivot arm 13 at a selected angle with respect to the tow arm 7.

An outer castor wheel 11 is pivotally attached to the tow arm 7 about a substantially vertical castor axis CA to support the outer end 7B of the tow arm 7 for movement along the ground. Similarly an inner castor wheel 11 is pivotally attached to the tow arm 7 about a substantially vertical castor axis CA to support the inner end 7A of the tow arm 7 for movement along the ground.

Since the wheels castor about the vertical axis CA, the hydraulic cylinder 20 can be extended and retracted on the go and the tow arm 7 will readily move left or right without any skidding of the castor wheels 10, 11 supporting it. The rotary mower unit 3 follows the tow arm 7 right or left. In the rotary mower unit 3 illustrated, the rear wheels 5 are quite far back of the tow arm 7, and the sideways motion of the tow arm 7 and the front of the rotary mower unit 3 somewhat skew the rear wheels 5 during the adjustment, but the rear wheels 5 align themselves in direction T when the adjustment is completed such that the rotary mower unit follows along the path at the adjusted offset.

An implement attachment mechanism 23 is attached to an outer portion of the tow arm 7 between the outer and inner castor wheels 11, 10 and is adapted for attachment of an implement to be towed behind the tow arm 7. In FIG. 1, the mechanism 23 includes a draw bar hitch, to which the conventional clevis 24 on the rotary mower unit 3 is attached with a pin 25, and a strut 27 attached at one end to the apparatus 100 at strut attachment point 28 on the tow arm 7 and adapted at the opposite end thereof for attachment to the rotary mower unit 3 at strut attachment point 29.

The strut 27 prevents lateral movement of the attached implement, rotary mower unit 3, with respect to the tow arm 7. To permit the rotary mower unit 3 to float, the strut attachment at points 28, 29 is by a ball and socket connection such as commonly used in trailer hitches.

Such a connection allows the strut 27 to move up and down while maintaining a substantially constant lateral distance between the rotary mower unit 3 and the tow arm 7. The strut 27 can include a cushion mechanism such as a heavy coil spring 26 or the like to allow the strut 27 to extend or retract slightly when a force exceeding a selected limit is exerted between the rotary mower unit 3 and the tow arm 7. Such a cushion would reduce stress and possible failure during contact with an obstacle, or a like occurrence.

Thus in the embodiment illustrated in FIGS. 2 and 3, a conventional rotary mower unit with conventional clevis 24 for attachment to a tractor draw bar is simply attached to the apparatus in the same manner as it would be attached to a tractor draw bar. The strut 27 is attached to prevent the rotary mower unit 3 from pivoting about the pin 25 as it would in conventional attachment to a tractor, and lateral movement of the rotary mower unit 3 with respect to the tow arm 7 is prevented.

Figure 4:
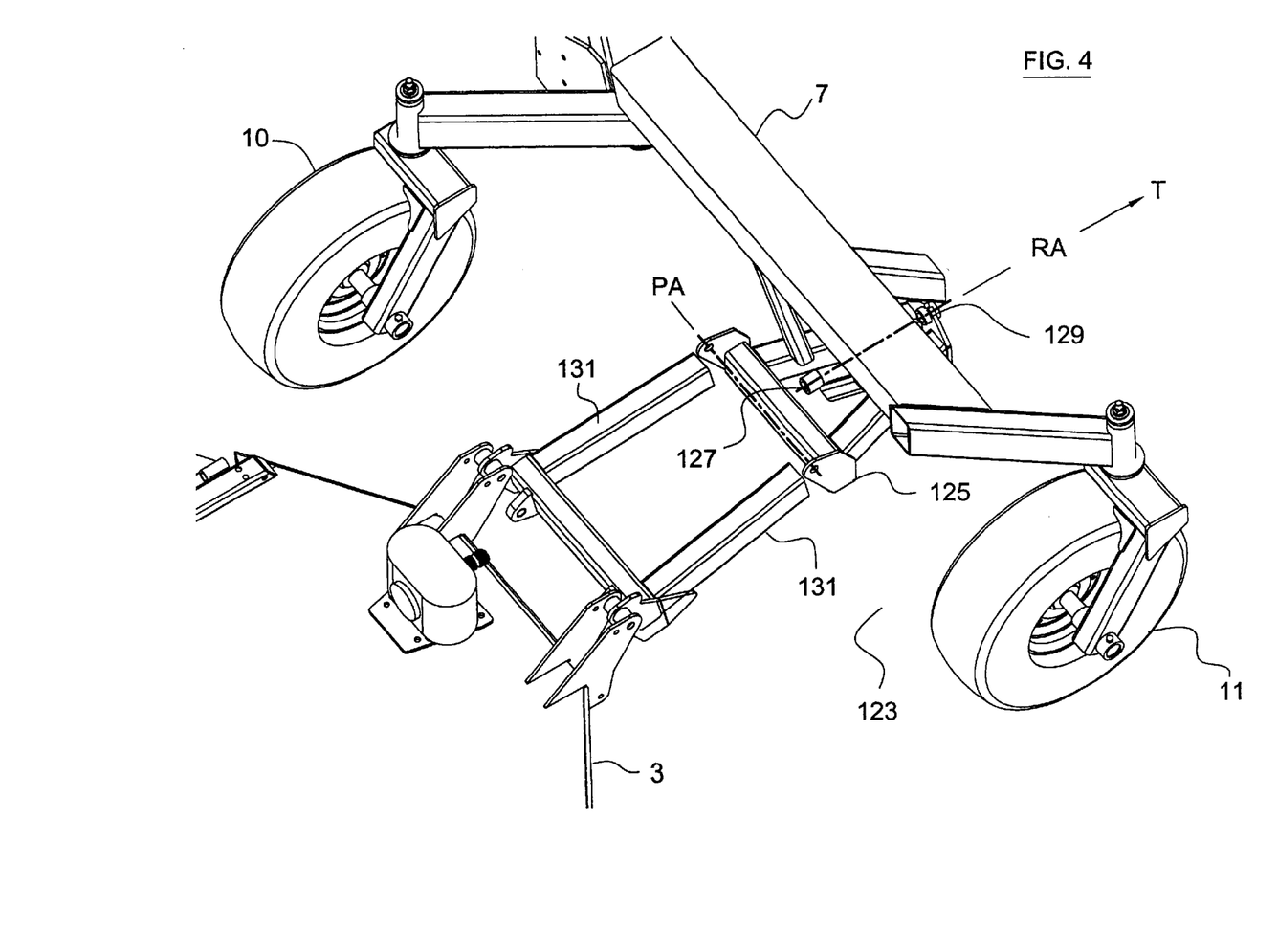
FIG. 4 is a perspective view showing an alternate attachment of the rotary mower unit to the tow arm.
Figure 5:
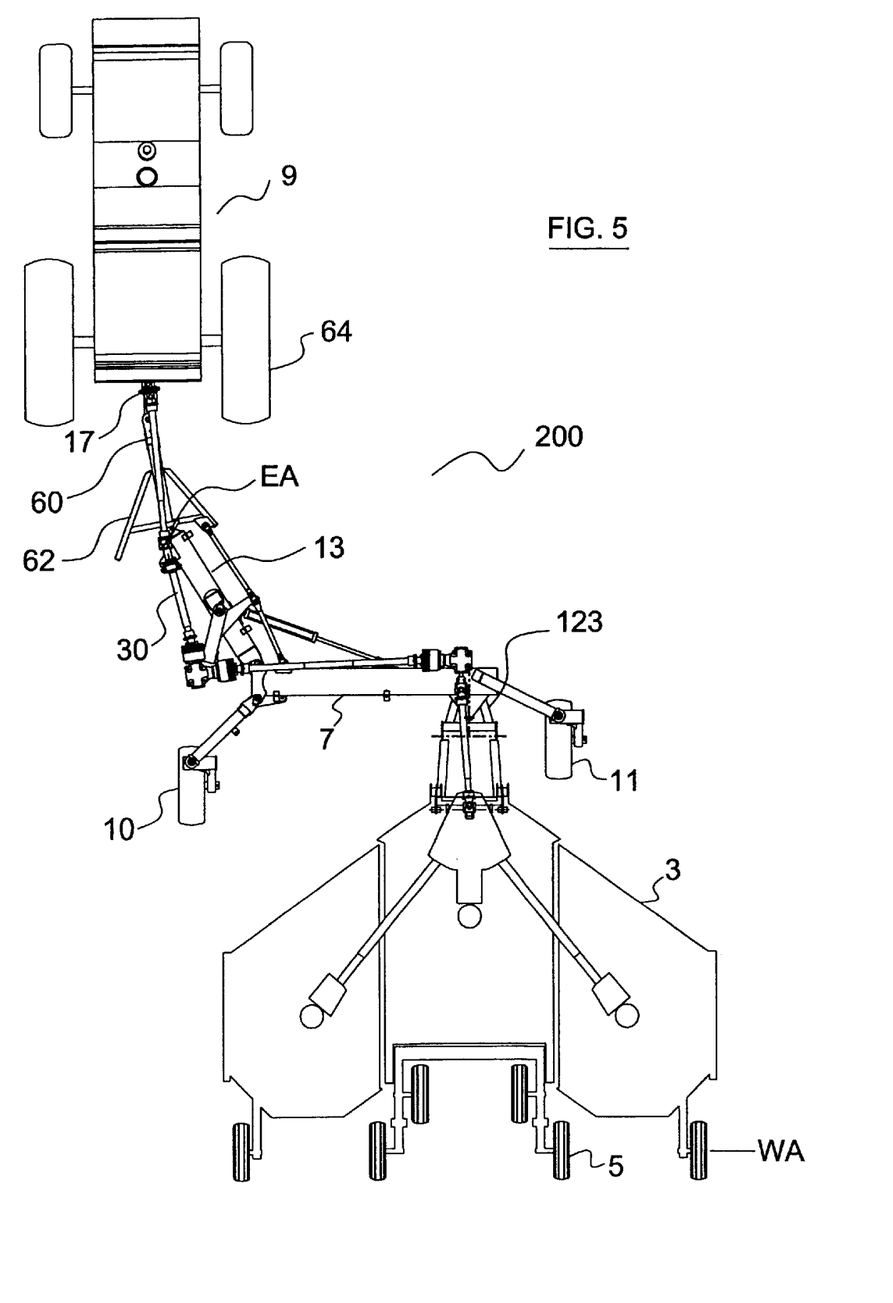
FIG. 5 is a schematic top view of an alternate embodiment of the invention including a draw bar hitch extension, and an alternate attachment of the rotary mower unit to the tow arm, in the offset position.
Figure 6:
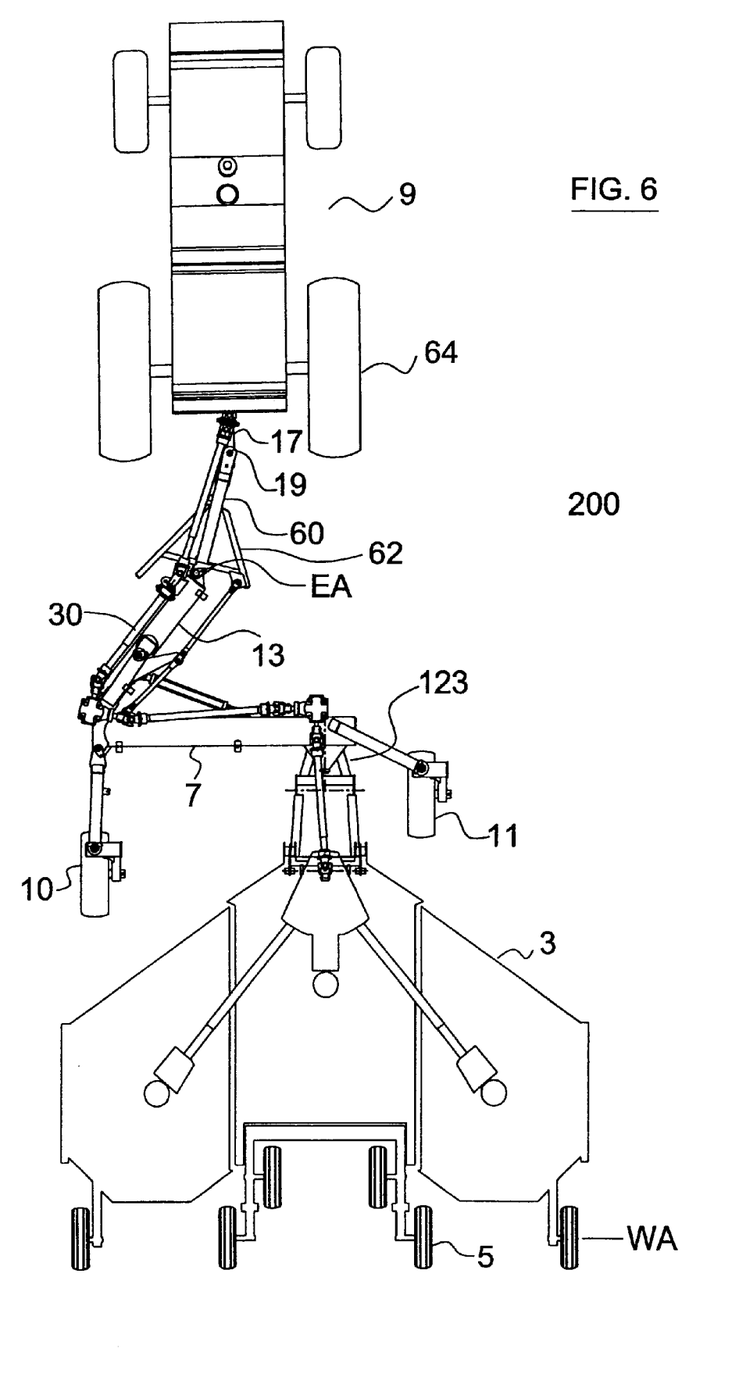
FIG. 6 is a schematic top view of the embodiment of FIG. 5 in the transport position.

FIGS. 4, 5, and 6 illustrate an alternate attachment of the rotary mower unit 3 to the tow arm 7. As best seen in the schematic illustration of FIG. 4, the implement attachment mechanism 123 comprises a roll member 125 pivotally attached to the tow arm 7 about a horizontal roll axis RA oriented parallel to the operating travel direction T. The roll member 125 is connected to the tow arm 7 by a roll pin 127 oriented along the roll axis RA and extending through a tube 129 fixed to the tow arm 7. Thus the roll member 125 is prevented from pivoting about a vertical yaw axis.

A pair of laterally spaced braces 131 are attached at rear ends thereof to the front end of the rotary mower unit 3 and are pivotally attached at front ends thereof by pins or the like to respective laterally spaced portions of the roll member 125 about a horizontal pitch axis PA oriented perpendicular to the operating travel direction T.

Thus the implement attachment mechanism 123 allows the rotary mower unit 3 to pitch and roll with respect to the tow arm 7, and thus follow ground contours, but prevents yawing of the rotary mower unit 3 with respect to the tow arm 7.

To power the rotary mower unit 3, a driveline 30 is adapted at an inner front end thereof for attachment to a power output shaft of the tractor 9 and is adapted at an outer rear end thereof for attachment to the power input shaft of the rotary mower unit 3. A power take off adapter 31 attaches to the power take off shaft of the tractor to connect front power transfer shaft 33 for rotation by the tractor to drive a first gear box 36. Lateral power transfer shaft 37 connects the first gear box 36 to the second gear box 38 which in turn drives the power output shaft 39 of the apparatus 100. The conventional coupler 35 of the rotary mower unit 3 is connected to the power output shaft 39 to drive the mower blades.

In the illustrated embodiment the first gear box 36 is attached to the apparatus 1 via a linkage 40 such that as the pivot arm 13 pivots with respect to the tow arm 7 from a transport position, illustrated in FIG. 3, to an offset position, illustrated in FIG. 2, the gear box 36 moves laterally inward in direction ID with respect to the tow arm 7 to reduce an operating angle of the power transfer shaft.

The inner castor wheel 10 is also attached to the linkage 40 such that as the pivot arm 13 pivots with respect to the tow arm 7 from the transport position of FIG. 3 to the offset position of FIG. 2, the inner castor wheel 10 moves laterally inward in direction ID with respect to the tow arm 7 in the same manner as the first gear box 36. As the pivot arm 13 pivots with respect to the tow arm 7 back from the offset position of FIG. 2 to the transport position of FIG. 3 the inner castor wheel 10 moves laterally outward in direction OD with respect to the tow arm 7 to thereby reduce the transport width of the apparatus 1.

The pivot arm 13 can be pivoted from the transport position of FIG. 3, wherein the front end of the pivot arm 13 is located in front of a midpoint of the tow arm 7, and the maximum offset position of FIG. 2 wherein the front end of the tow arm 13 is located lateral to the inner end 7A of the tow arm 7.

FIGS. 5 and 6 illustrate an alternate embodiment of the rotary mower apparatus 200 where the apparatus 200 further comprises a draw bar hitch extension 60 adapted at a front end thereof for attachment to the tractor draw bar hitch 17. The draw bar hitch extension 60 is pivotally attached about a substantially vertical axis EA to the front end of the pivot arm 13. A linkage 62 is operative to maintain the draw bar hitch extension 60 substantially aligned with the tractor as the pivot arm 13 pivots with respect to the tow arm 7. The draw bar hitch extension 60 thus moves the attachment point of the pivot arm 13 rearward so that tighter turns can be made without interference with the tractor tires 64. The linkage 62 maintains draw bar hitch extension generally aligned with the tractor 9 so that the front end of the pivot arm 13 is maintained near the center of the tractor, only farther rearward, thereby maintaining proper tracking of the apparatus with respect to the tractor.

In FIG. 5 the apparatus 200 is illustrated in the maximum offset position, and in FIG. 6 the apparatus 200 is illustrated in the transport position.

In the embodiments illustrated above, the assembly of the implement and the tow arm is laterally rigid, allowing the assembly to be driven rearward in the same manner as conventionally connected implements.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

I claim:

1. An offset tow arm apparatus for towing an implement in an operating travel direction, where the implement is supported by at least one wheel having a rotational axis substantially perpendicular to the operating travel direction, the apparatus comprising:
  a tow arm having an inner end adapted for pivotal attachment at a front portion thereof to a towing vehicle hitch such that the tow arm extends laterally from an attached towing vehicle, and such that the tow arm can pivot about a substantially vertical axis, and an outer end;
  at least one castor wheel pivotally attached to the tow arm about a substantially vertical castor axis to support the tow arm for movement along the ground in any direction;
  an implement attachment mechanism at an outer portion of the tow arm adapted for attachment of an implement to be towed behind the tow arm such that the attached implement is prevented from pivoting about a vertical axis with respect to the tow arm.

2. The apparatus of claim 1 further comprising:
  an outer castor wheel pivotally attached to the apparatus about a substantially vertical castor axis to support the outer end of the tow arm for movement along the ground;
  an inner castor wheel pivotally attached to the apparatus about a substantially vertical castor axis to support the inner end of the tow arm for movement along the ground.

3. The apparatus of claim 2 wherein the implement attachment mechanism is attached to an outer portion of the tow arm between the outer and inner castor wheels.

4. The apparatus of claim 1 wherein the inner end of the tow arm is adapted for pivotal attachment at a front portion thereof to a towing vehicle hitch by a pivot arm having a rear end pivotally attached to the inner end of the tow arm about a substantially vertical axis, and having a front end adapted for pivotal attachment to a towing vehicle hitch, and further comprising a lock operative to lock the pivot arm in a fixed position with respect to the tow arm.

5. The apparatus of claim 4 wherein the lock comprises a hydraulic cylinder operative to selectively pivot the pivot arm with respect to the tow arm, and operative to maintain the pivot arm in a selected fixed position with respect to the tow arm.

6. The apparatus of claim 1 further comprising a driveline adapted at an inner front end thereof for attachment to a power output shaft of a tractor and adapted at an outer rear end thereof for attachment to a power input shaft of an implement.

7. The apparatus of claim 1 wherein the implement attachment mechanism is adapted for pivotal attachment of an implement about a substantially horizontal pitch axis oriented substantially perpendicular to the operating travel direction, and is adapted for pivotal attachment of an implement about a substantially horizontal roll axis oriented substantially parallel to the operating travel direction, and is adapted for substantially rigid attachment of an implement about a substantially vertical yaw axis.

8. The apparatus of claim 1 wherein the implement attachment mechanism comprises a strut attached at one end to the apparatus and adaptedat an opposite end thereof for attachment to an implement to prevent lateral movement of the implement with respect to the tow arm.

9. An offset rotary mower apparatus adapted at a front end thereof for attachment to a tractor for movement in an operating travel direction, the apparatus comprising:
  a rotary mower unit supported at a rear end thereof by at least one rear wheel having a rotational axis oriented substantially perpendicular to the operating travel direction;
  a tow arm extending laterally from a front end of the rotary mower unit such that an inner end of the tow arm is offset from the rotary mower unit, and such that the tow arm is maintained in a substantially fixed lateral position with respect to the rotary mower unit;
  a pivot arm extending forward from the inner end of the tow arm and having a rear end pivotally attached to the tow arm about a substantially vertical axis, and having a front end adapted for pivotal attachment to a tractor draw bar hitch such that the pivot arm can pivot about a substantially vertical axis;
  an actuator operative to selectively pivot the pivot arm-with respect to the tow arm, and operative to maintain the pivot arm in a-selected fixed position with respect to the tow arm;
  an outer castor wheel pivotally attached to the apparatus about a substantially vertical castor axis to support the outer end of the tow arm for movement along the ground;
  an inner castor wheel pivotally attached to the apparatus about a substantially vertical castor axis to support the inner end of the tow arm for movement along the ground;
  a driveline adapted at an inner front end thereof for operative connection to a power output shaft of a tractor and operatively connected at an outer rear end thereof to a power input shaft of the rotary mower unit.

10. The apparatus of claim 9 wherein the pivot arm can be pivoted from a transport position wherein the front end of the pivot arm is located in front of a midpoint of the tow arm, and an offset position wherein the front end of the tow arm is located lateral to the inner end of the tow arm.

11. The apparatus of claim 9 wherein the rotary mower unit is pivotally attached to the tow arm about a substantially horizontal pitch axis oriented substantially perpendicular to the operating travel direction, and is pivotally attached to the tow arm about a substantially horizontal roll axis oriented substantially parallel to the operating travel direction, and is rigidly attached to the tow arm about a substantially vertical yaw axis such that pivoting about the yaw axis is substantially prevented.

12. The apparatus of claim 9 further comprising a strut attached at one end thereof to the tow arm and attached at an opposite end thereof to the rotary mower unit to prevent lateral movement of the rotary mower unit with respect to the tow arm.

13. The apparatus of claim 12 wherein the strut comprises a cushion mechanism adapted to allow the strut to extend or retract slightly when a force exceeding a selected limit is exerted between the rotary mower unit and the tow arm.

14. The apparatus of claim 9 wherein the driveline comprises a power transfer shaft adapted at one end thereof for operative connection to a power output shaft of a tractor, and attached at an opposite end thereof to a gear box, and wherein the gear box is attached to the apparatus via a linkage such that as the pivot arm pivots with respect to the tow arm, from a transport position to an offset position the gear box moves laterally inward with respect to the tow arm to reduce an operating angle of the power transfer shaft.

15. The apparatus of claim 14 wherein the inner castor wheel is attached to the linkage such that as the pivot arm pivots with respect to the tow arm from a transport position to an offset position the inner castor wheel moves laterally inward with respect to the tow arm, and such that as the pivot arm pivots with respect to the tow arm from the offset position to the transport position the inner castor wheel moves laterally outward with respect to the tow arm to reduce a transport width of the apparatus.

16. The apparatus of claim 9 further comprising a draw bar hitch extension adapted at a front end thereof for attachment to a tractor draw bar hitch, and pivotally attached about a substantially vertical axis to the front end of the pivot arm, and further comprising a linkage operative to maintain the draw bar hitch extension generally aligned with the tractor as the pivot arm pivots with respect to the tow arm.

17. An offset rotary mower apparatus adapted at a front end thereof for attachment to a tractor for movement in an operating travel direction, the apparatus comprising:
- a rotary mower unit supported at a rear end thereof by at least one rear wheel having
- a rotational axis oriented substantially perpendicular to the operating travel direction;
- a tow arm extending laterally from a front end of the rotary mower unit such that an inner end of the tow arm, adapted for attachment to a towing vehicle, is offset from the rotary mower unit;
- means to substantially prevent lateral movement of the tow arm with respect to the rotary mower unit;
- at least one castor wheel pivotally attached to the apparatus about a substantially vertical castor axis to support the tow arm for movement along the ground in any direction.

18. The apparatus of claim 17 further comprising:
- an outer castor wheel pivotally attached to the apparatus about a substantially vertical castor axis to support an outer end of the tow arm for movement along the ground;
- an inner castor wheel pivotally attached to the apparatus about a substantially vertical castor axis to support the inner end of the tow arm for movement along the ground.

19. The apparatus of claim 17 wherein the means to prevent lateral movement of the tow arm comprises a pair of laterally spaced braces attached at rear ends thereof to the front end of the rotary mower unit and attached at front ends thereof to the tow arm.

20. The apparatus of claim 19 wherein the braces are pivotally attached to laterally spaced portions of a roll member about a substantially horizontal pitch axis oriented substantially perpendicular to the operating travel direction, and wherein the roll member is pivotally attached about a substantially horizontal roll axis oriented substantially parallel to the operating travel direction, and is rigidly attached about a substantially vertical yaw axis such that pivoting about the yaw axis is substantially prevented.

21. The apparatus of claim 17 wherein the means to prevent lateral movement of the tow arm comprises a strut attached at one end thereof to the tow arm and attached at an opposite end thereof to the rotary mower unit.

22. The apparatus of claim 21 wherein the strut comprises a cushion mechanism adapted to allow the strut to extend or retract slightly when a force exceeding a selected limit is exerted between the rotary mower unit and the tow arm.

23. The apparatus of claim 17 wherein the inner end of the tow arm is adapted for attachment to a towing vehicle hitch by a pivot arm having a rear end pivotally attached to the inner end of the tow arm about a substantially vertical axis, and having a front end adapted for pivotal attachment to a towing vehicle hitch such that the pivot arm can pivot about a substantially vertical axis, and further comprising a lock operative to lock the pivot arm in a fixed position with respect to the tow arm.

24. The apparatus of claim 23 wherein the means to lock the pivot arm in a fixed position comprises a hydraulic cylinder.

* * * * *